(12) United States Patent
Perez

(10) Patent No.: US 6,289,628 B1
(45) Date of Patent: Sep. 18, 2001

(54) FISHHOOK

(76) Inventor: Frank Perez, 6504 Albany St., Huntington Park, CA (US) 90255

( * ) Notice: Subject to any disclaimer, the term of this patent is extended or adjusted under 35 U.S.C. 154(b) by 0 days.

(21) Appl. No.: 09/514,677

(22) Filed: Feb. 28, 2000

(51) Int. Cl.[7] .................................................. A01K 83/00
(52) U.S. Cl. ........................................................... 43/43.16
(58) Field of Search ................................. 43/43.16, 44.82

(56) References Cited

U.S. PATENT DOCUMENTS

| | | | |
|---|---|---|---|
| 828,505 | * | 8/1906 | Rice ....................... 43/43.16 |
| 2,514,527 | * | 7/1950 | Verhota ................. 43/44.82 |
| 2,816,392 | * | 12/1957 | Goldberg et al. .... 43/43.16 |
| 2,841,914 | * | 7/1958 | Butler .................... 43/43.16 |
| 3,505,756 | * | 4/1970 | Bowden ................. 43/43.16 |
| 4,028,838 | * | 6/1977 | Flower ................... 43/43.16 |
| 4,570,373 | * | 2/1986 | Brief ...................... 43/43.16 |
| 4,723,372 | * | 2/1988 | Moser .................... 43/43.16 |
| 4,757,634 | * | 7/1988 | Meixsell, Jr. ......... 43/43.16 |
| 4,905,403 | * | 3/1990 | Manno ................... 43/43.16 |
| 5,097,622 | * | 3/1992 | James .................... 43/43.16 |
| 5,165,197 | * | 11/1992 | Sitton ..................... 43/44.82 |
| 5,386,660 | * | 2/1995 | Levin ..................... 43/43.16 |
| 5,526,603 | * | 6/1996 | Fujii et al. ............. 43/43.16 |
| 5,685,108 | * | 11/1997 | Lepage et al. ........ 43/43.16 |
| 5,941,014 | * | 8/1999 | Battaglia ............... 43/44.82 |

FOREIGN PATENT DOCUMENTS

| | | | |
|---|---|---|---|
| 584392 | * | 10/1959 | (CA) ...................... 43/43.16 |
| 2095521 | * | 10/1982 | (GB) . |
| 2267423 | * | 12/1993 | (GB) . |
| 2281684 | * | 3/1995 | (GB) . |
| WO 97/04648 | * | 2/1997 | (WO) . |
| WO 97/14302 | * | 4/1997 | (WO) . |

* cited by examiner

*Primary Examiner*—Darren W. Ark
(74) *Attorney, Agent, or Firm*—Oppenheimer, Wolff & Donnelly, LLP

(57) ABSTRACT

A fishhook having a shank and an integral curved bend portion terminating in a spear portion ending in a sharp point. The spear portion has an axis generally parallel to the shank with a generally uniform cross-section. The spear has a side facing the shank having a rounded barbed portion between the point and the curved bend portion.

2 Claims, 3 Drawing Sheets

US 6,289,628 B1

FISHHOOK

BACKGROUND OF THE INVENTION

1. Field of the Invention

The invention relates to fishing generally, and particularly to an improvement in fishhook design to allow the fishhook to be more easily removed from the fish with less damage to the mouth and other parts of the fish.

2. Related Art

This hook is designed for catch-and-release purposes. Catch-and-release has been practiced for many years. It is a practice in which fisherman catch a fish and then release it to preserve the fish stock, because they do not like fish, or to comply with local size and limit rules.

This style of fishing requires a hook which will hold the fish and be easily removed as well while damaging the fish minimally. These requirements are not met by the predominant hook used today: the barb hook. The barb hook holds the fish but damages it when a release is attempted. The alternative (to allow a fish's release) has mostly been a barbless hook. However, this design allows the fish to easily escape as no fishing-retaining means (a barb) is provided on the spear. Thus, a fisherman has little choice when using a barbless hook if he or she wishes to keep some fish and release others.

Fishhooks consist of an eye, a shank, a bend, and a spear. The structure resembles a letter "J" with the eye at the top of the long leg of the J, the shank forming the long leg of the J, the bend at the bottom of the J, and the spear forming the short leg of the J. The point is located within the spear, and is measured from the sharp top at the end of a hook back to the tip of the hook barb.

A conventional barb can injure a fish when release is attempted. Others have attempted to address this negative aspect of the barb by use of a mechanical element covering the barb during removal. U.S. Pat. No. 2,816,392 to Goldberg describes such a hook. The hook is complicated as it has many parts and would therefore be expensive. Furthermore, it does not fully address the problem with the barbed hook design as the hook still has a barb which can cause damage to a fish.

Another approach uses a movable barb retained in the hook which rotates into an engaged or disengaged position. Like the Goldberg design above, this design uses moving parts and would, therefore, be expensive and more difficult to use in that a fisherman would have to reach in the fish and rotate the part before removing the hook. U.S. Pat. No. 4,757,634 to Meixell. Such parts may also lock up and not move easily after repeated use.

Another approach is to take a standard barbed fish-hook and press the pointed end of the barb back to the spear. This leaves a bump that is not uniform, can still catch the mouth of the fish, thereby hurting it, could damage the hook, and hurt the fisherman.

The last approach described in U.S. Pat. No. 5,685,108 to Lepage is a fishhook that has two depressions with sharp leading edges in the wire of the hook. The problem with this design is that the tip is perceived as weak by the fisherman. There is thus a need for a fishhook that: (1) can effectively hold a fish; (2) does minimal damage to the fish; (3) is easily and safely used; (4) causes no real or perceived structural weakness to the hook; and (5) allows the fisherman the choice of either releasing or keeping a fish.

SUMMARY OF THE INVENTION

The foregoing requirements (and solutions to the above problems) are achieved in the present invention of a fishhook with a shank, a bend portion, and a spear portion in which the spear's barb is not the traditional barb but a rounded barb. This barb will start immediately and substantially perpendicular to the bend portion closest to the shank, on the inside of the hook, quickly rounding off toward the barb's point.

It is the principal object of the present invention to provide a fishhook having good fish-retention characteristics which is easily removed from a fish for catch and release.

It is another object of the present invention to provide a fishhook which can be used in a manner identical to conventional barbed and barb-less fishhook in treble hook making, fish fly tying, and lure hook assemblies.

It is another object of the present invention to provide a fishhook having good catch-and-release characteristics having no moving parts.

It is another object of the present invention to provide a fishhook which has good fish-retaining characteristics and good release characteristics, that can be used as simply and efficiently as present conventional barbed and barb-less hooks.

These and other objects are preferably accomplished by providing a fishhook having a shank and an integral curved bend portion terminating in a spear portion. The spear portion has an axis generally parallel to the shank with a generally uniform cross-section. The spear has a side facing the shank having a rounded barbed portion between the point and the curved bend portion.

DESCRIPTION OF THE PREFERRED EMBODIMENTS

Figure 1:
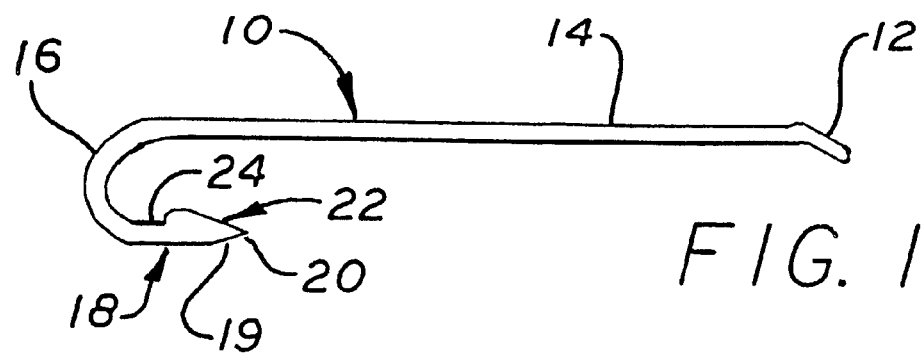
FIG. 1 is side elevational view of a complete fishhook in accordance with the invention.

Referring now to the drawings wherein the showings are for the purposes of illustrating a preferred embodiment of the invention and not for the purpose of limiting the same. FIG. 1 shows a fishhook 10 having an eye 12, a straight shank 14, a return bend portion 16, a spear portion 18, a point portion 19, a point's sharpened end 20, a rounded barb 22, and a pre-barb section 24. The hook's overall shape is that of a letter J with the shank 14 forming the longer leg of the J. This J shape is conventional. However, it is not the only shape in which fishhooks come (e.g., double hooks, treble hooks, circle hooks, etc.). The invention to be described is applicable to most, if not all, of such shapes.

The eye 12 is a circle with a hole through the center through which fishing line can be passed and tied. It is conventional.

As FIG. 1 shows, the spear 18 does not have a traditional barb. Most prior art hooks include a barb which extends away from the spear 18 toward the shank 14. The traditional barb has a pointed end meant to retain the hook in the mouth of the fish.

Figure 2:
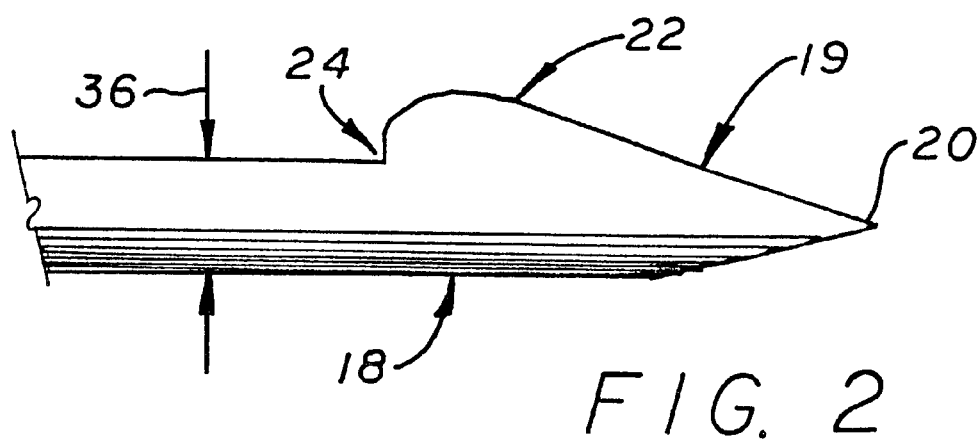
FIG. 2 is an enlarged elevational view of the spear portion of the fishhook of FIG. 1.

As can be seen in FIG. 1 the fishhook 10 of the present invention has a barb different in kind to the traditional barb in that it starts, at the end closest to the bend portion 16, with a small pre-barb section 24 at a substantially perpendicular angle to the axis of spear 18 which almost immediately rounds out to complete the rounded barb. The rounded barbs are shown in greater detail in FIGS. 2–7 which show various implementations of the rounded barb spear section. In FIG. 2, the rounded barb, at its widest part, is 1.5 times the girth, or width, of the wire diameter 36 from which the hook is made. As can be seen in FIG. 2, pre-barb section 24 is substantially perpendicular to the axis of the hook spear 18.

This provides holding power while also allowing removal of the hook with minimal damage to the fish. The sloped front all forming point portion 19 allows the lip membrane of the fish to slide into the pre-barb section 24 easily as seen in FIG. 3.

By selecting the depth of the spear 18 to be approximately 50% thicker or more than wire diameter 36, the material that is left is not weakened by the new design.

Figure 3:
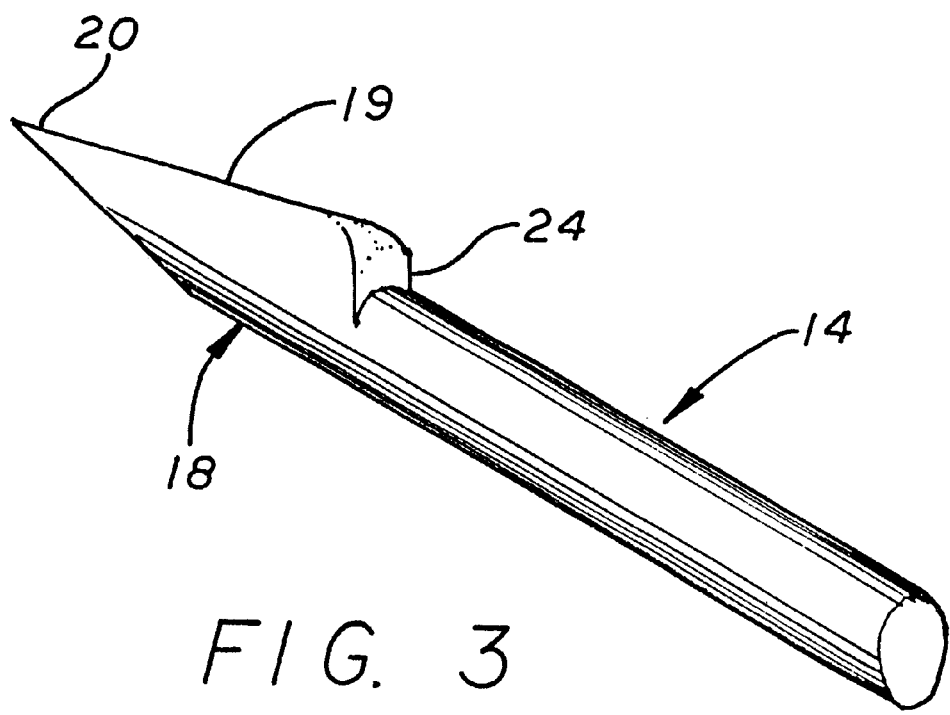
FIG. 3 is a perspective view of the spear portion alone of the fishhook on FIG. 1.
Figure 4:
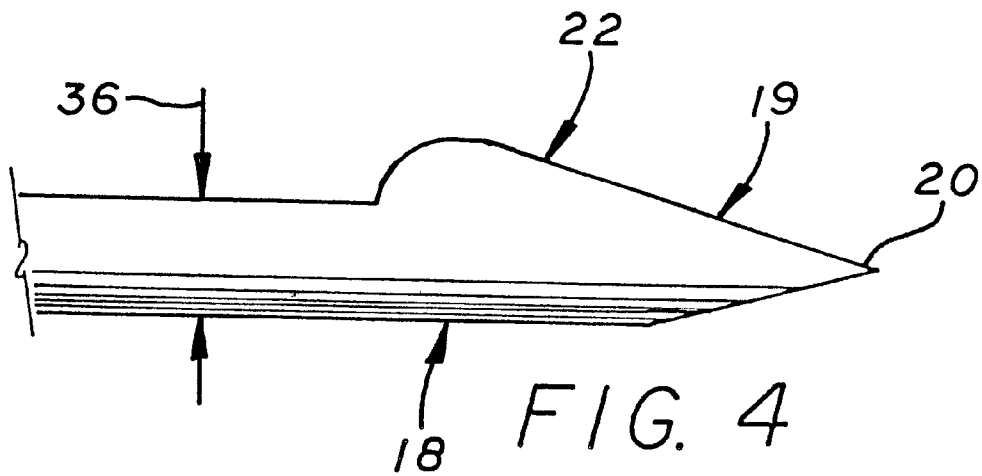
FIG. 4 is an enlarged side elevational view of a first modification of spear portion of the fishoook of FIG. 1 in which the pre-barb section of FIG. 1 is absent.
Figure 5:
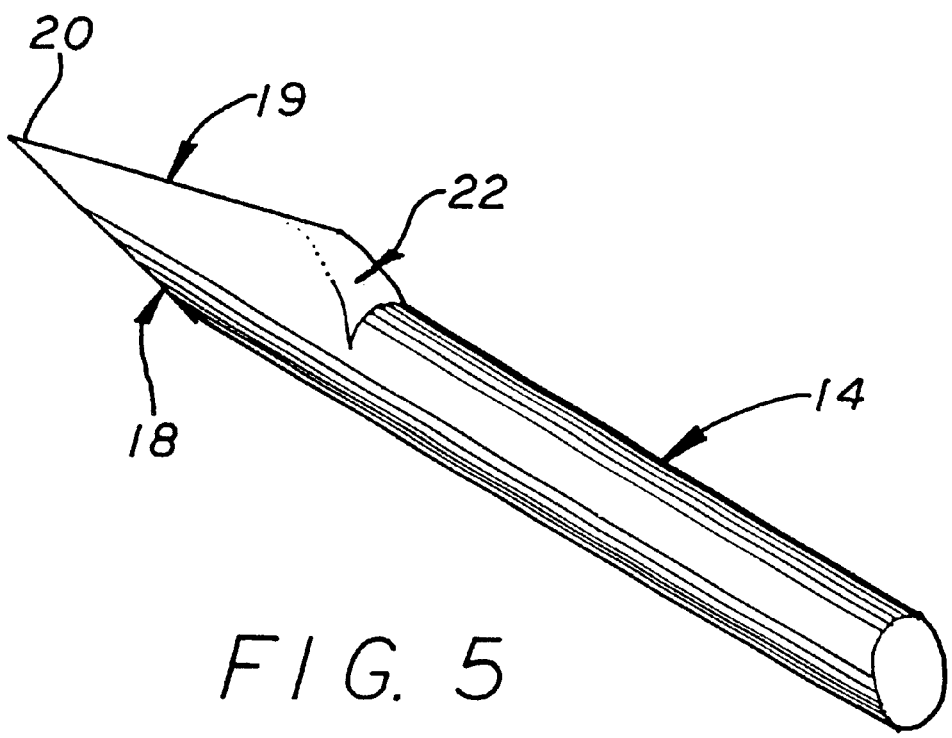
FIG. 5 is a perspective view of the spear portion of the fishhook of FIG. 4.

FIGS. 4 and 5, wherein like numerals refer to like parts of the embodiment of FIGS. 1 to 3, show a variation of the spear 18 in which the pre-barb section 24 is absent. That is, as seen in FIGS. 4 and 5, instead of a perpendicular pre-barb section 24, there is a smooth transition from shank 14 to barb 22.

Figure 6:
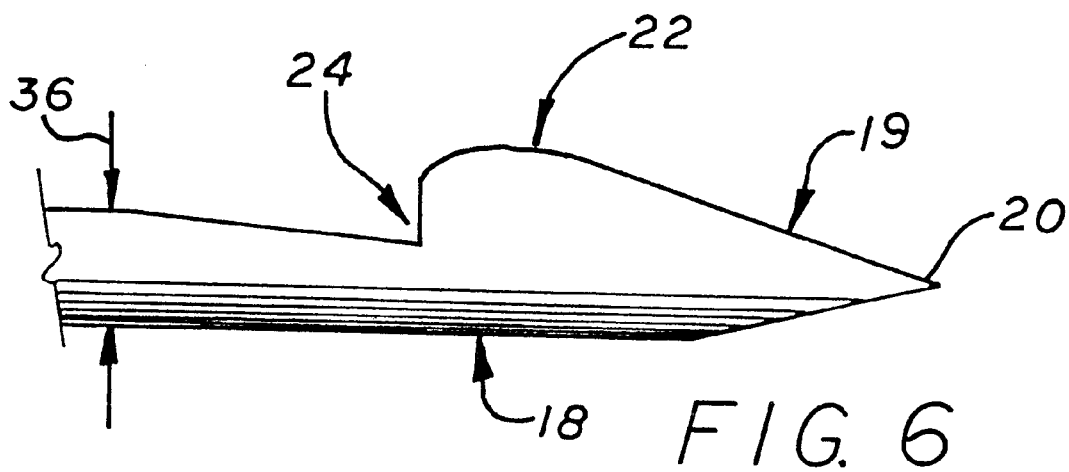
FIG. 6 is an enlarged side elevation of a second modification of the spear portion of the fishhook of FIG. 1 in which the wire diameter 36 tapers down in the section immediately preceding the pre-barb of FIG. 1.
Figure 7:
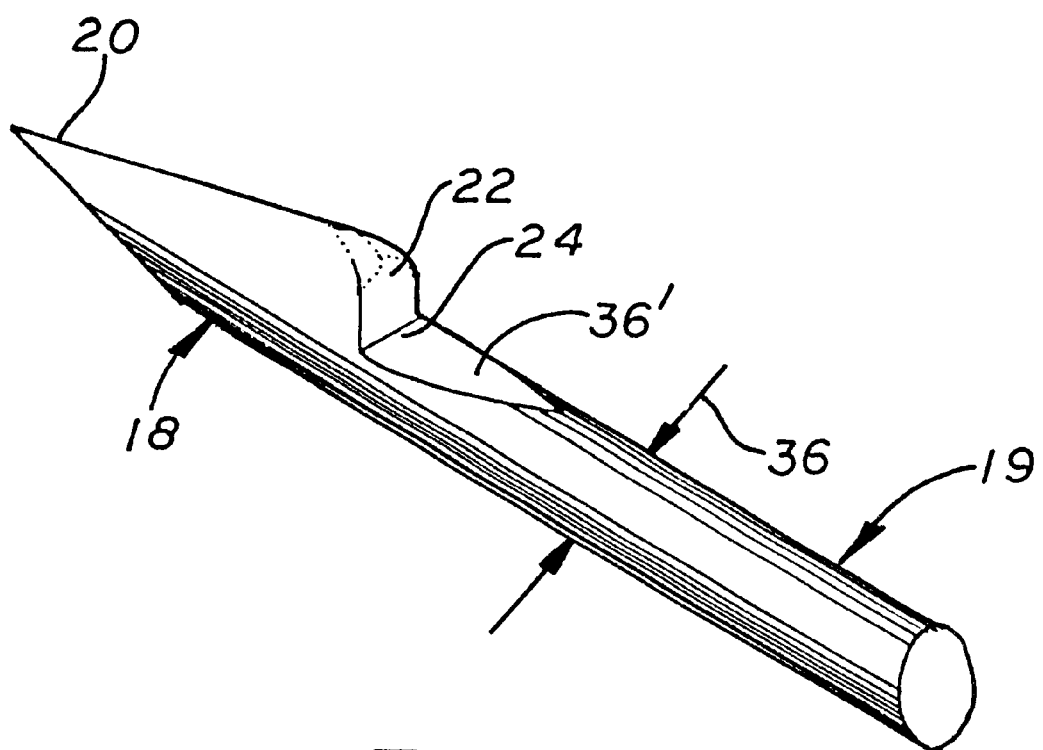
FIG. 7 is a perspective view of the spear portion of the fishhook of FIG. 6.

FIGS. 6 and 7, wherein like numerals refer to like parts of the embodiment of FIGS. 1 to 3, show a variation of the spear 18 in which the wire diameter 36 tapers down in the area 36' immediately preceding the pre-barb section 24.

All embodiments of the invention disclose a rounded-barb spear. The point 20 may be of several configurations; conical spear end, truncated cylindrical point end, triple edge, etc.

The invention has been described with reference to preferred embodiments. Obviously, modifications and alterations will occur to others upon a reading and an understanding of the specification and it is my intention to include such modifications and alterations insofar as they come within the scope of the appended claims.

I claim:

1. A fishhook comprising:

an apertured eye;

an integral elongated shank having an elongated axis terminating in an integral return bend portion;

a spear portion integral with the bend portion having a longitudinal axis generally parallel to the elongated as of said shank, said spear portion being rounded in cross sections;

a barb, integral with said spear portion adjacent and generally parallel to said shank and facing the same said barb terminating in a sharpened point;

said barb having a pre-barb section having a surface extending upwardly in a direction normal to the longitudinal axis of said spear portion, said surface being integrally formed with said spear portion at a first end and integrally formed with a rounded barb section at a second end, said rounded barb section tapering toward said sharpened point; and the rounded cross section of said spear portion intersecting said pre-barb surface at an intermediate point between said first end and said second end.

2. The fishhook of claim 1 wherein said upwardly extending surface has a flat configuration.

* * * * *